Sept. 4, 1962   J. W. LYNCH   3,052,306
MULTIPLE PURPOSE PLOW
Filed June 3, 1959   5 Sheets-Sheet 1

John W. Lynch INVENTOR.

Sept. 4, 1962 J. W. LYNCH 3,052,306
MULTIPLE PURPOSE PLOW
Filed June 3, 1959 5 Sheets-Sheet 4

John W. Lynch
INVENTOR.

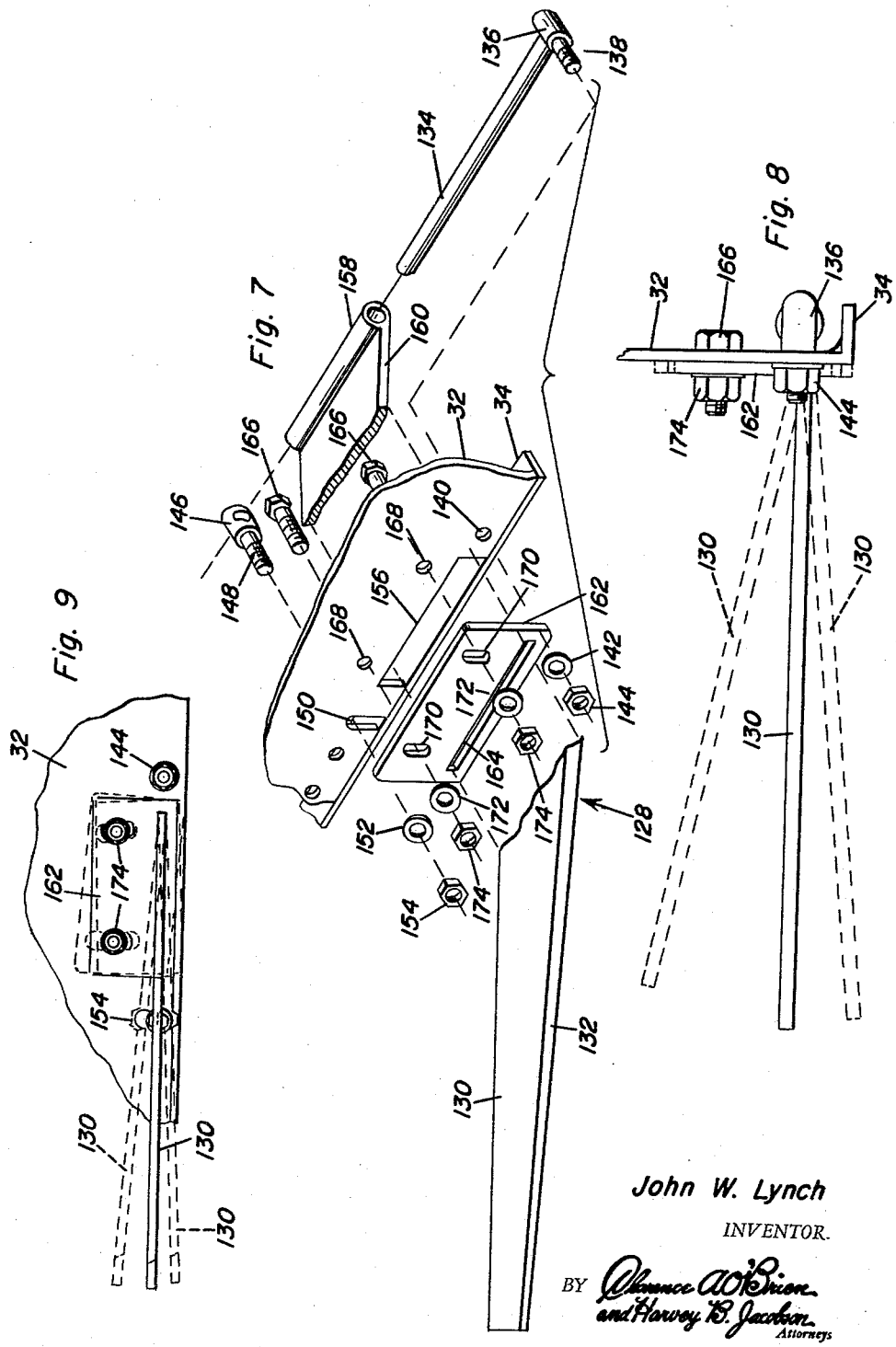

United States Patent Office 3,052,306
Patented Sept. 4, 1962

3,052,306
MULTIPLE PURPOSE PLOW
John W. Lynch, Lubbock, Tex., assignor to
Josh Randolph, Lubbock, Tex.
Filed June 3, 1959, Ser. No. 817,849
11 Claims. (Cl. 172—140)

This invention relates in general to new and useful improvements in agricultural implements, and more specifically to a multiple purpose plow.

In the conventional mounting of farm implements, the implements are mounted directly upon the tool bar of the tractor with the result that the implements do not individually compensate for the irregularities in the level of the ground. It is therefore the primary object of this invention to provide a plow unit which is of such a nature that each plow unit can rise or fall with variation in the level of the ground independently of the other plow units attached to the tractor tool bar, and in operation, the plow units will function simultaneously and provide for uniformity of depth for preparing beds, for planting, and for cultivation of the plants after a crop is up.

A further object of the invention is to provide a novel sled which may be mounted on a tractor tool bar for vertical movement relative thereto, the sled being provided with runners which will engage the ground and follow the contour thereof, the sled being provided with suitable tool mounting means whereby the necessary tools may be carried by the sled to perform the ground shaping operations.

Still another object of this invention is to make use of the customary tractor tool bar in a novel manner. Normally the tractor tool bar is used for a direct attachment of tools, such as listers, knifing apparatus, etc. and the gauge wheels on the tools bars serve to lower or heighten the plow depth. The tool bar is usually 12 feet in length and when the individual plow tools are connected directly to the tool bar, there is uneven cultivation. In accordance with the object of this invention, the tools are connected to the tool bar for vertical movement independently of the tool bar so that the individual tools may follow the contour of the ground which is being worked.

A further object of the invention is to provide a novel linkage for attaching a tool carrying sled to a tractor tool bar, the linkage being of a parallelogram type and being spring-loaded whereby it is normally positioned with respect to the tool bar, but may be biased to offset positions above and below the tool bar and to have pressure engagement with the ground so that the sled will follow the contour of the ground during a ground working operation.

Still another object of the invention is to provide a novel plow which includes a sled adapted to be carried by a tool bar, the sled having means for mounting a coulter disk thereon, the mounting means of the coulter disk being capable of both vertical and angular adjustment whereby the coulter disk may be vertically adjusted or angularly adjusted to produce the desired ground working effect.

Still another object of the invention is to provide a novel knife assembly, the knife assembly including a sled having mounting means for attachment to a tractor tool bar, the knife assembly being mounted upon the sides of the sled for adjustment both about a longitudinal axis and a transverse axis whereby the desired operation may be obtained with the knife by the proper adjustment thereof.

A still further object of the invention is to provide a novel plow assembly which includes a sled having means mounting it on a tractor tool bar, the sled being provided with attachments for mounting various types of tools including coulter disks, knives, cultivator plows, rotary hoes, and planters.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 6 is a fragmentary front elevational view on a reduced scale of a plow assembly and shows one of the plow units in a cultivating operation;

FIGURE 7 is an enlarged exploded perspective view showing the mounting of one of the knives with respect to a side plate of the plow sled;

FIGURE 8 is an enlarged fragmentary front elevational view showing further the details of the mounting of one of the knives with respect to a side plate of the sled, adjusted positions of the knife about a longitudinal axis being shown in dotted lines;

FIGURE 9 is a fragmentary side elevational view of the sled and knife and shows the knife in adjusted positions about a transverse axis, the adjusted positions being shown by dotted lines:

FIGURE 10 is an enlarged fragmentary perspective view of the means for mounting the coulter disk;

FIGURE 11 is an enlarged fragmentary perspective view showing a portion of the carrier means for mounting the coulter disk and shows the manner in which a vertical support bar is carried thereby;

FIGURE 12 is an enlarged fragmentary transverse sectional view taken substantially upon the plane indicated by section line 12—12 of FIGURE 10 and shows the mounting of one of the support arms for a coulter disk, a lowered position of the carrier and support arm being shown by dotted lines.

Figure 2:
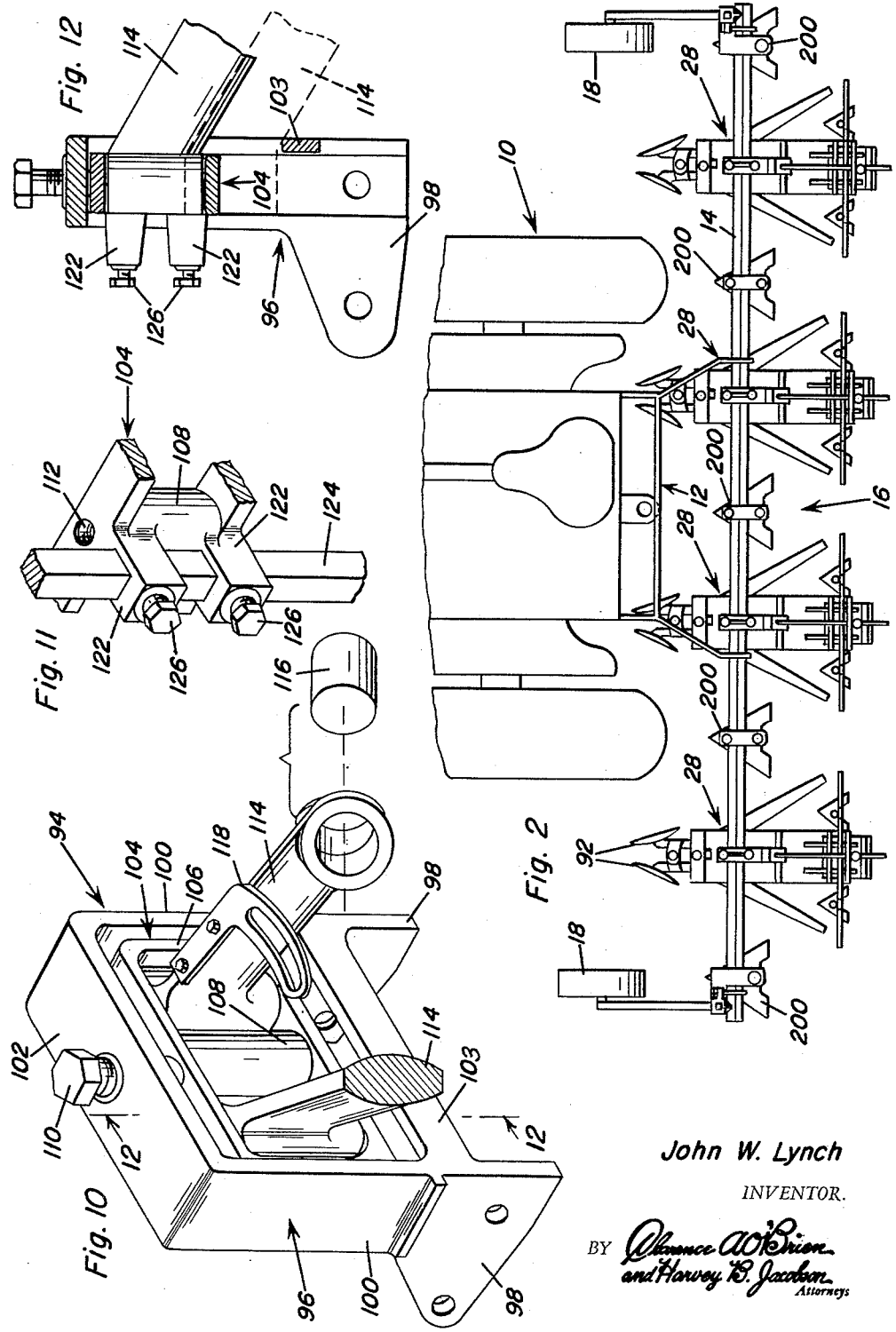
FIGURE 2 is a plan view on a reduced scale showing a plow assembly utilizing a plurality of the plow units of FIGURE 1 and shows the same attached to a tractor by means of the tractor tool bar.

Referring now to the drawings in detail, it will be seen that there is illustrated in FIGURE 2 a rear portion of a conventional tractor which is referred to in general by the reference numeral 10. The tractor 10 includes a lift arm mechanism generally referred to by the numeral 12, the lift arm mechanism having secured thereto for vertical movement a conventional tool bar 14. The tool bar 14 extends transversely of the tractor 10 at the rear thereof and projects to both sides thereof. The tool bar 14 supports a plow assembly which is generally referred to by the numeral 16.

Figure 3:
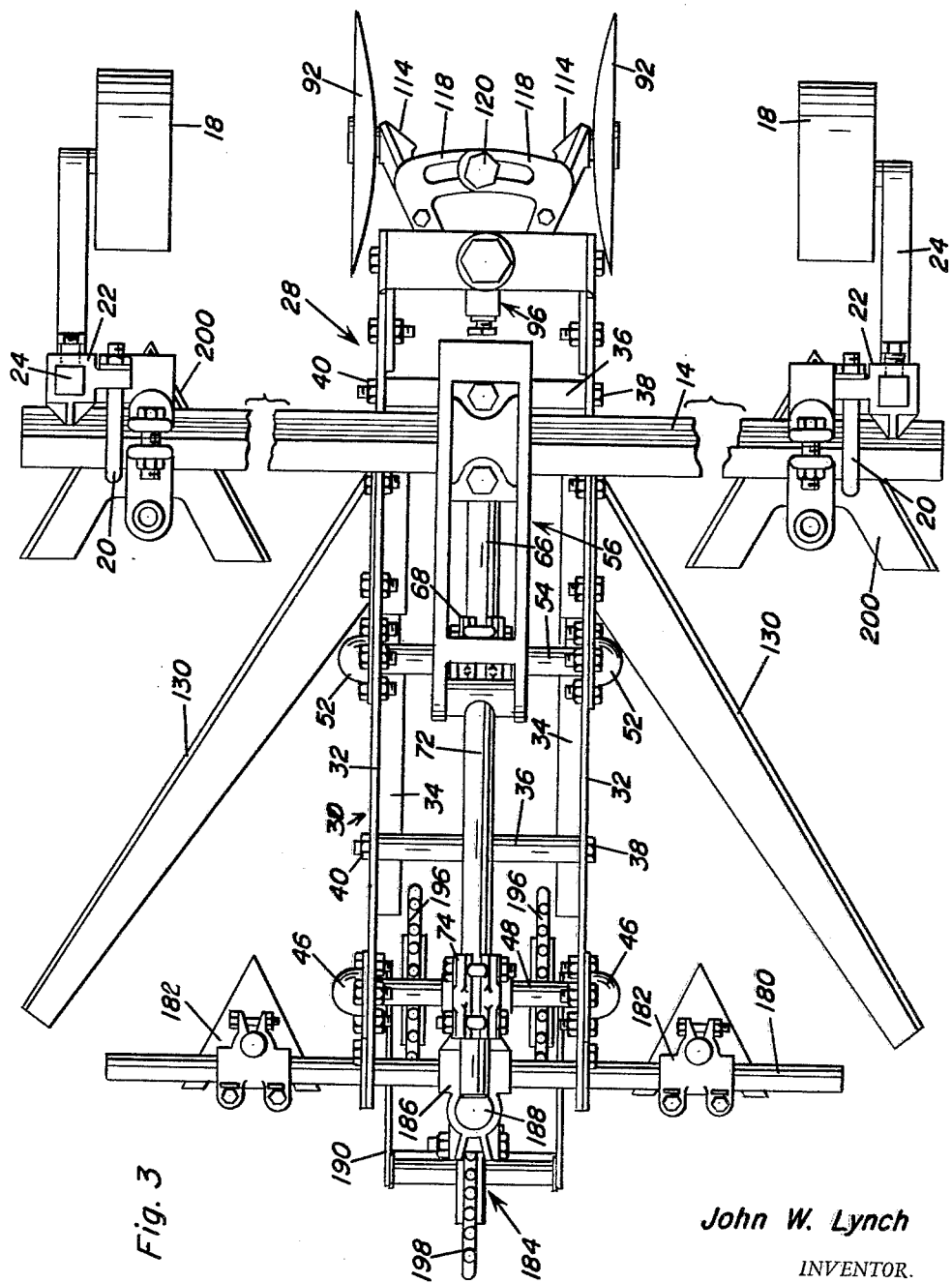
FIGURE 3 is an enlarged plan view of the plow unit of FIGURE 1 and shows further the details thereof, the gauge wheels for supporting the outer ends of the tractor tool bar being shown, intermediate parts of the tractor tool bar being broken away.
Figure 4:
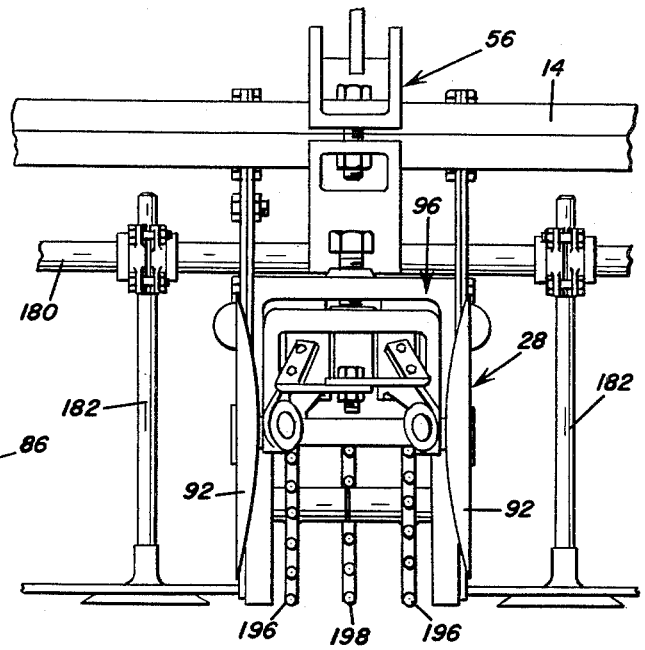
FIGURE 4 is a front elevational view of the plow unit of FIGURES 1 and 3 and shows further the details thereof.

When the plow assembly 16 is in operation, the tool bar 14 is supported, as shown in FIGURES 2 and 3, a predetermined distance above the surface of the ground by means of a pair of gauge wheels 18 mounted at opposite ends thereof. Each of the gauge wheels 18 is adjustably secured to the tool bar 14 by means of a clamp 20 which has a sleeve portion 22 in which a vertical portion of a support 24 for the gauge wheel 18 is positioned. The support 24 has a horizontal axle 26 on which the gauge wheel 18 is rotatably mounted. The support 24 is vertically adjustable with respect to the clamp 20 to facilitate the positioning of the tool bar 14 at the desired operating height.

Referring once again to FIGURE 2 in particular, it will be seen that a plurality of plow units, generally referred to by the numeral 28, are secured to the tool bar 14. Since these plow units 28 are identical, only one of the plow units 28 will be described in detail hereinafter.

Figure 1:
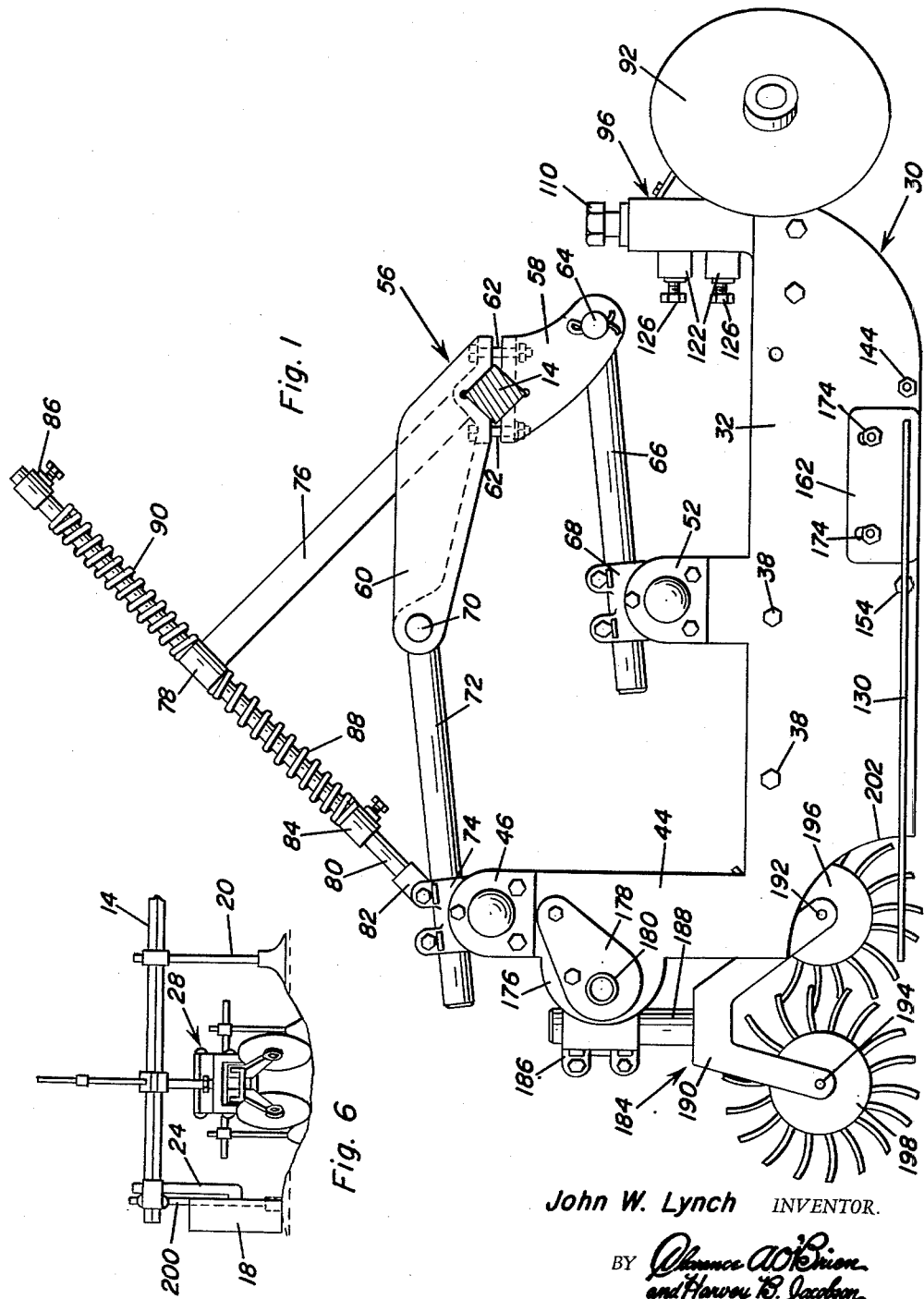
FIGURE 1 is a side elevational view of one of the plow units, which is the subject of this invention, and shows the plow unit mounted on a tractor tool bar, only the tool bar, shown in section, of the tractor being shown.
Figure 5:
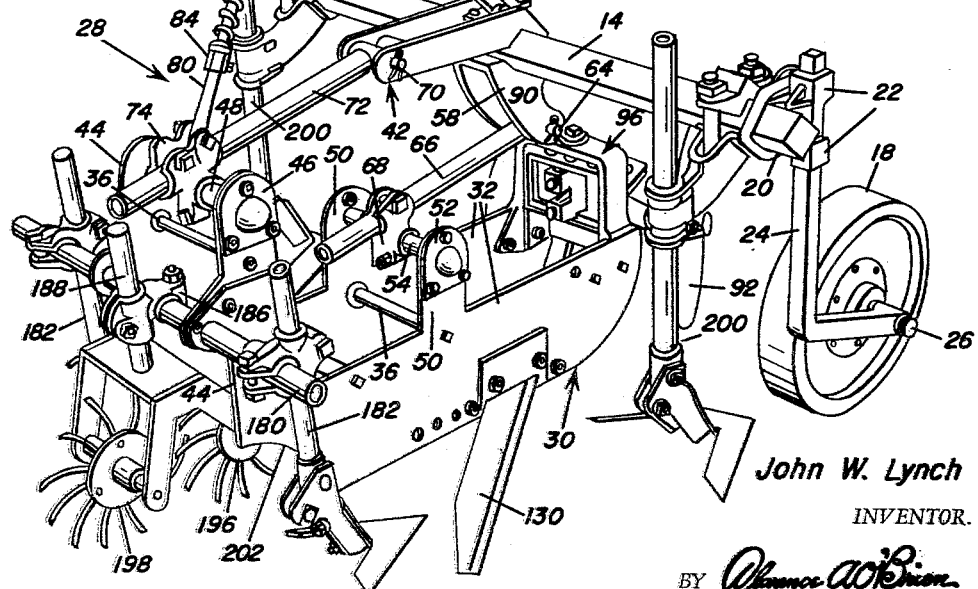
FIGURE 5 is a perspective view on a reduced scale showing one of the plow units mounted on an outer end of a tractor tool bar and further shows the arrangement of one of the gauge wheels for the tractor tool bar and cultivator plows mounted on the tractor tool bar on opposite sides of the plow unit.

Each of the plow units 28 includes a sled generally referred to by the numeral 30, see FIGURES 1, 3 and 5. The sled 30 is formed from a pair of side plates 32 which terminate at their lower edges in opposed inwardly extending runners 34, see also FIGURE 7. The side plates 32 are secured together at spaced intervals through the use of the spacer sleeves 36 therebetween and bolts 38 extending through the side plates 32 and the spacer sleeves 36. The opposite ends of the bolts 38 are provided with nuts 40 to clamp the assembly together.

The sled 30 is mounted on the tool bar 14 by a mounting means generally referred to by the numeral 42. The mounting means 42 includes a pair of upstanding legs 44 at the rear of the side plates 32. The upstanding legs 44 are transversely aligned and have secured thereto fittings 46 which support a transverse shaft 48 for pivotal movement.

A pair of transversely aligned arms 50 extend upwardly from the side plates 32 intermediate the ends thereof. The arms 50 have fittings 52 secured to upper portions thereof, the fittings 52 being transversely aligned and being similar to the fittings 46. A transverse shaft 54 extends between and is rotatably journalled in the fittings 52.

A two-piece clamp assembly, generally referred to by the numeral 56, is secured to the tool bar 14 centrally of the sled 30. The clamp assembly includes a lower bifurcated clamp member 58 and an upper bifurcated clamp member 60, the clamp member 58 extending downwardly and forwardly and the clamp member 60 extending generally rearwardly. The clamp members 58 and 60 are secured together by means of a pair of fasteners 62 disposed on opposite sides of the tool bar 14.

A transverse pivot pin 64 extends between the lower portions of the clamp member 58. The pivot pin 64 supports a lower trailing arm 66. The lower trailing arm 66 is adjustably received in a fitting 68 which is rigidly secured to the shaft 54.

The rear part of the clamp member 60 supports a transverse pivot pin 70. The pivot pin 70 supports an upper trailing arm 72 which is slidably received and normally clamped in a fitting 74 which is similar to the fitting 68. The fitting 74 is clamped on the shaft 48.

As is best shown in FIGURE 1, the distance between the centers of the pivot pins 64 and 70 is normally equal to the distance between the centers of the shafts 48 and 54. When the sled 30 is horizontally mounted, the effective length of the trailing arms 66 and 72 will be the same. In this manner a parallelogram linkage is provided so that the movement of the sled 30 is vertical. Should it be desired that the forward end of the sled 30 be slightly above the rear end thereof, then the effective length of the trailing arm 66 will be shortened. On the other hand, should it be desired that the rear end of the sled 30 be elevated above the forward end thereof, then the trailing arm 72 may have its effective length shortened. Of course, the same results can be obtained by lengthening the effective length of the trailing arm 72 in the first instance and lengthening the length of the trailing arm 66 in the second instance.

A support arm 76 extends upwardly and rearwardly from the clamp member 60. The support arm 76 terminates at its upper end in a transverse sleeve 78. A rod 80 is provided at the lower end thereof with a fitting 82 which is pivotally connected to the fitting 74. The rod 80 loosely extends through the sleeve 78. A lower collar 84 and an upper collar 86 are adjustably positioned on the rod 80 on opposite sides of the sleeve 78. A lower coil spring 88 is mounted on the rod 80 and extends between the sleeve 78 and the collar 84. An upper spring 90 is mounted on the rod 80 and extends between the sleeve 78 and the collar 86. The springs 88 and 90 normally balance each other and serve to support the sled 30 from the tool bar 14. When the plow unit 28 is in operation, the tool bar 14 is moved downwardly to a point where the sled 30 compressively engages the ground. As a result, the sled 30 moves upwardly with respect to the sleeve 78 and the coil spring 88 is compressed while the coil spring 90 is temporarily relaxed. By so compressing the coil spring 88, the sled 30 is constantly urged downwardly towards the ground and will follow the contour of the ground. Further, the mounting of the sled 30 is such that in the event the sled 30 should hit a high point as compared to the remainder of the plow assembly, the individual sled 30 may move upwardly to follow the contour of the ground.

The sled 30 is intended to support a variety of different types of tools. The first of these is a pair of coulter disks 92 which are mounted at the forward end of the sled 30. A support assembly 94, see FIGURES 10–12, is provided for the coulter disks 92.

The support assembly 94 includes a support member 96 which is positioned between the forward part of the plates 32 and has depending flanges 98 which are secured to the side plates 32. The upper part of the support 96 is defined by a pair of upstanding legs 100 and a cross bar 102. The brace 103 extends between the flanges 98.

A carrier, generally referred to by the numeral 104 is mounted within the support 96 for guided vertical movement. The carrier 104 is normally fixed and is supported by the support 96. The carrier 104 includes a generally rectangular frame 106 which is received between the legs 100 and is prevented from twisting thereby. A sleeve 108 extends vertically through the center of the carrier 104. An adjusting screw 110 is rotatably supported by the cross bar 102 and is threadedly engaged in an internally threaded bore 112 extending through the sleeve 108. In this manner a carrier 104 is adjustably vertically positioned with respect to the support 96. A pair of forwardly and downwardly extending support arms 114 are pivotally mounted on the carrier 104 on opposite sides of the sleeve 108. The support arms 114 each terminate at their forward ends in a stub axle 116 (see FIGURE 10), on which an associated one of the coulter disks 92 is mounted. The support arms 114 are swingable about vertical axes within the carrier 104. In this manner the angle of the two coulter disks 92 with respect to the direction of movement of the plow assembly 16 may be varied. The support arms 114 are retained in adjusted positions through a pair of braces 118 which are secured to the support arms 114, see FIGURES 3 and 10, and whose overlapping portions are adjustably secured together by a bolt 120.

As is best shown in FIGURE 11, the carrier 104 has a pair of rearwardly extending, generally horizontal sleeves 122. The sleeves 122 are vertically aligned and may have a suitable vertical support bar 124 extending therethrough. The support bar 124 is secured in place in the sleeves 122 through the use of setscrews 126 carried by the sleeves. The bar 124 may be used to support a planter or other type of implement in an elevated position above the sled 30.

A knife assembly, generally referred to by the numeral 128, see FIGURES 1, 3, 5, 7–9, is secured to each of the side plates 32. Each knife assembly 128 includes an outwardly projecting knife 130 which slopes rearwardly from its associated side plate 32. Each knife 130 is provided with a forward cutting edge 132.

The individual knife 130 is secured to its respective side plates 32 by means of an elongated support shaft 134, see FIGURE 7. The support shaft 134 extends longitudinally of its respective side plate 32 upon the inner face thereof and is provided at the forward end thereof with a fitting 136. The fitting 136 includes a transverse pivot member 138 which extends through an opening 140 in the side plate 32 and is retained in an adjusted position by a lock washer 142 and a nut 144.

A fitting 146 is removably mounted on the rear end of the shaft 134. The fitting 146 includes a threaded pivot pin portion 148 which extends through a vertical slot 150 in the side plate 32. A lock washer 152 and a nut 154 retains the fitting 146 in a vertically adjusted position.

The lower part of the side plate 32 is provided with a generally rectangular opening 156 of a size to permit the passage of a sleeve portion 158 formed on an offset end 160 of the knife 130. The sleeve portion 158 receives the shaft 134 and thus mounts the knife 130 for pivoting about a longitudinal axis.

A cover plate 162 is carried by the offset part 160 of the knife 130 and has a slot 164 receiving the offset part 160. The plate 162 is normally secured in place against the side of the side plate 32 by a pair of bolts 166 which extends through holes 168 in the side plate 32 and slots 170 in the cover plate 162. Each bolt 166 is provided with a lock washer 172 and a nut 174. Through the provision of the slots 170, the mounting plate 162 may be vertically adjusted so as to retain the knife 130 in a position pivoted about the shaft 134. The range of these several positions are illustrated in FIGURE 8 by dotted lines.

As is best illustrated in FIGURE 9, the knife 130 is also adjustable about a transverse axis. This is accomplished by pivoting the shaft 134 about the pivot pin 138. The adjustment is permitted due to the positioning of the pivot pin 148 in the slot 150.

The upper portion of each of the legs 44 is provided with rearwardly offset parts 176. A fitting 178 is secured to the outer face of each of the legs 44. The fittings 178 are aligned and support a tool bar 180 which extends therethrough and which may support a variety of tools. For example, cultivator plows and shovels 182 are clamped to the outer portions of the tool bar 180. If desired, a third cultivator shovel 182 may be clamped to the tool bar 180 intermediate the side plates 32. However, a rotary hoe, see FIGURE 1, generally referred to by the numeral 184 is illustrated as being positioned between the side plates 32.

The rotary hoe 184 includes a clamp 186 which is secured to the tool bar 180 intermediate the side plates 32. The clamp 186 in turn supports a vertical post 188 carrying a frame 190. The frame 190 supports a forward shaft 192 and a rear shaft 194. A pair of widely spaced rotary hoe members 196 are rotatably journalled on the shaft 192. A centrally located rotary hoe member 198 is mounted on the shaft 194.

Reference is now had to FIGURE 5 in particular. It will be seen that other cultivator plows or shovels 200 are secured directly to the tool bar 14. The pattern of these complementary shovels 200 may vary as desired. However, normally at least one of the cultivator shovels will be placed at each end of the tool bar 14 rearwardly of and in alignment with one of the gauge wheels 18 so as to eliminate the tire tread mark thereof.

Although the plow units 28 have been illustrated as being four in number in FIGURE 2 and staggered with respect to the rear wheels of the tractor 10, when the coulter disks 92 and their supports are removed, the relation of the plow units 28 may be varied so that one of the plow units 28 may be disposed immediately rearwardly of each of the tractor rear wheels.

It will be readily apparent that the sleds 30 are of such a construction whereby any desired type of tool may be supported thereby. Furthermore, because of the particular novel mounting of the sleds 30, the sleds 30 and the tools carried thereby will follow the contour of the ground thereby obtaining the desired cultivation.

Each of the side plates 32 has a quadrant of a circle removed at the rear thereof as at 202. The openings 202 are to permit the cultivator shovels 182 to throw soil in against the plant row. In order that the soil may be more uniformly distributed, two rotary hoes 196 can be located between the side plates 32 thus protecting the plants from the impact of the larger masses of soil and at the same time pulverizing and distributing the soil.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A multiple purpose plow comprising a sled, tool mounting means carried by said sled, and means for mounting said sled on a tool bar, said sled mounting means including a clamp adapted to be fixedly mounted on a tool bar, a pair of trailing arms pivotally connected to said clamp, and fittings carried by said sled pivotally connecting said trailing arms to said sled, said sled mounting means including a rod pivotally connected to said sled, an arm fixedly secured to said clamp, a sleeve carried by said arm receiving an intermediate part of said rod, and counter balance springs carried by said rod and engaging opposite ends of said sleeve.

2. A multiple purpose plow comprising a sled having side plates, ground engaging runners along the lower edges of said side plates, means for mounting said sled on a tool bar, and tool mounting means carried by said side plates, said tool mounting means including a support disposed between forward ends of said side plates, a carrier carried by said support, forwardly extending support arms extending from said carrier, and coulter disks mounted on said support arms.

3. The plow of claim 2 wherein said carrier is slidably mounted in said support, and means carried by said support for adjusting the vertical position of said carrier to vertically position said coulter disks.

4. The plow of claim 2 wherein said support arms are pivotally mounted for pivoting about vertical axes to vary the angle of said coulter disks, and adjustable brace means extending between said support arms.

5. The plow of claim 4 wherein said carrier is slidably mounted in said suport, and means carried by said support for adjusting the vertical position of said carrier to vertically position said coulter disks.

6. A multiple purpose plow comprising a sled having side plates, ground engaging runners along the lower edges of said side plates, means for mounting said sled on a tractor tool bar, a knife extending outwardly from and through a slot in each of said side plates, and mounting means carried by the inside surface of each of said side plates and mounting its respective knife for tilting about a longitudinal axis, fastening means engaging said side plates and knives and fixedly securing the latter in adjusted tilted positions.

7. A multiple purpose plow comprising a sled having side plates, ground engaging runners along the lower edges of said side plates, means for mounting said sled on a tractor tool bar, a knife extending outwardly from and through a slot in each of said side plates, and mounting means carried by the inside surface of each of said side plates and mounting its respective knife for tilting about both longitudinal and transverse axes, fastening means engaging said side plates and knives and fixedly securing the latter in adjusted tilted positions.

8. The plow of claim 6 wherein said knife mounting means includes a longitudinal shaft, a first fitting pivotally connecting one end of said shaft to a respective one of said side plates, and a second fitting vertically adjustably securing the other end of said shaft to a respective one of said side plates.

9. A multiple purpose plow comprising a sled having side plates, ground engaging runners along the lower edges of said side plates, a knife extending outwardly from and through a slot in each of said side plates, and mounting means including a bracket pivoted to and carried by the inside surface of each of said side plates and mounting its respective knife for tilting about a transverse axis, fastening means engaging said side plates and knives and fixedly securing the latter in adjusted tilted positions.

10. The plow of claim 9 wherein said knife mounting means includes a longitudinal shaft, said knife being pivotally mounted on said shaft.

11. A multiple purpose plow comprising a sled having side plates, ground engaging runners along the lower edges of said side plates, means for mounting said sled on a tool bar, a knife extending outwardly from and through a slot in each of said side plates, and mounting means carried by the inside surface of each of said side plates and mounting its respective knife for tilting about longitudinal and transverse axes, said knife mounting means including a longitudinal shaft, a first fitting pivotally connecting one end of said shaft to a respective one of said side plates, and a second fitting vertically adjustably securing the other end of said shaft to a respective one of said side plates, said knife being pivotally mounted on said shaft.

References Cited in the file of this patent

UNITED STATES PATENTS

| | | |
|---|---|---|
| 800,562 | Friedeman | Sept. 26, 1905 |
| 842,066 | Beymer | Jan. 22, 1907 |
| 866,185 | Brown | Sept. 17, 1907 |
| 1,092,377 | McAtee | Apr. 7, 1914 |
| 1,155,833 | Melton | Oct. 5, 1915 |
| 1,252,337 | Fritsche | Jan. 1, 1918 |
| 1,770,648 | Johnson | July 15, 1930 |
| 1,993,105 | Lindsey et al. | Mar. 5, 1935 |
| 2,004,416 | Orelind | June 11, 1935 |
| 2,046,211 | Rutherford et al. | June 30, 1936 |
| 2,259,864 | Smith | Oct. 21, 1941 |
| 2,273,392 | Coker | Feb. 17, 1942 |
| 2,405,796 | May | Aug. 13, 1946 |
| 2,593,176 | Patterson | Apr. 15, 1952 |